R. SUMMERS.
Smut Mill.
No. 2,927.
2 Sheets—Sheet 1.
Patented Jan'y 29, 1843.
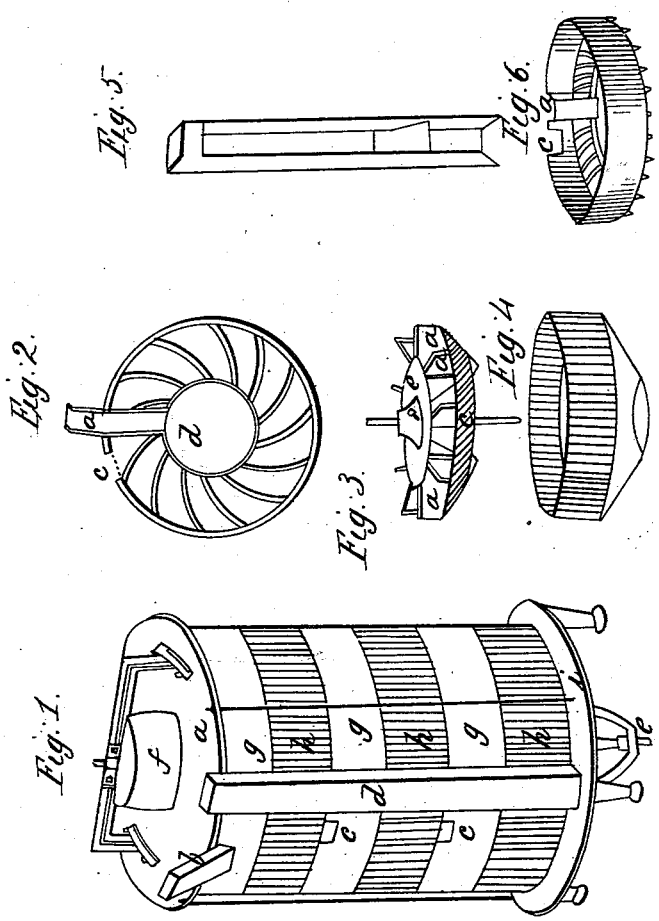

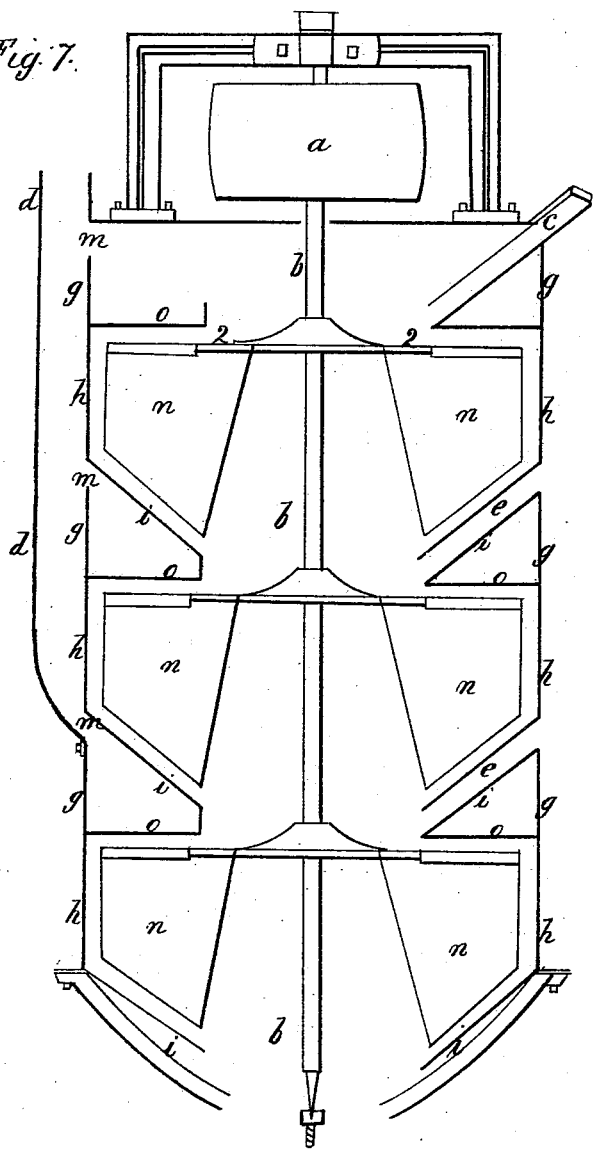

UNITED STATES PATENT OFFICE.

RALPH SUMMERS, OF SENECA FALLS, NEW YORK.

SMUT-MACHINE.

Specification of Letters Patent No. 2,927, dated January 27, 1843.

*To all whom it may concern:*

Be it known that I, RALPH SUMMERS, of Seneca Falls, in the county of Seneca and State of New York, have invented a new and useful Improvement in Smut-Machines, which I call the "Combined Conical Smut-Machine;" and do hereby declare that the following is a full and exact description thereof.

In the annexed drawings Figure 1, represents the outward view of my improved smut machine when set up and ready for action, presenting the appearance of an upright cylinder, with a revolving spindle or shaft passing longitudinally through its center similar to many other smut machines.

The cylinder or outer case of my improved smut machine consists of a series of short drums or hoops of equal diameter fitted to each other so that when put together they form the cylinder as represented in Fig. 1, above mentioned. These short drums or hoops are of two kinds and are arranged in alternate order or rather in pairs, one of each kind constituting a pair. In the annexed drawing Fig. 1, represents the machine as composed of three such pairs; but a greater number may be combined if necessary, although I have found that three pair are sufficient under ordinary circumstances. These hoops are each seventeen inches internal diameter and of such thickness as to insure sufficient strength, one quarter of an inch is sufficient. The rings $g$, $g$, $g$, Fig. 1, are each four inches in height and each has a circular grate attached to its lower part extending over the whole section of the ring leaving however a circular orifice in the center ten inches in diameter. The bars of the grates radiat from this central opening, where they are supported by a circular curb which projects above the grates about one inch, the outer ends of the grates being attached to the hoop. The upper sides of the grates are beveled so as to form an edge or sharp angle to prevent smut and dust from lodging upon them. In the annexed drawing Fig. 2, is a birds eye view and Fig. 6 a perspective view of this set of hoops and grates. In both figures there is a channel at $a$, open at each end, sectional area two by three inches extending from the periphery of the hoops to the central circular opening, $d$, for the admission of air into the machine; there is also another opening or simple orifice through the hoops at $c$, area two and a half by three inches for the discharge of air smut, dust &c. The other hoops $h$, $h$, $h$, Fig. 1, are each five inches in height, to the lower edge of each of these hoops is attached a conical bottom extending downward at an angle of about thirty-five degrees until it reaches within three inches of the center forming a hollow truncated cone, the base being upward attached to the hoop having a circular opening at the lower part of the diameter of six inches. The inner surfaces of these hoops and of their conical bottoms are furrowed or fluted and constitute the stationary rubbing or working surfaces of the machine, aided somewhat by the circular grates above mentioned; a perspective view of one of these hoops with its conical bottom is shown by the drawing Fig. 4, hereto annexed. All the above described six hoops are placed one upon another in alternate order, the hoops at the bottom being one having a conical bottom, the next above having a grate and so on; and when so confined together by rods running through a projecting top and bottom plate constitute the stationary part of the machine, as shown by Fig. 1.

A revolving spindle or shaft passes vertically through the center of the machine and to this spindle are attached a number of sets of beaters or fans equal to the number of working hoops or hoops with conical bottoms, one set of fans being within each of these last mentioned hoops. These beaters are of sufficient width to perform the office of fans or blowers and for a machine of seventeen inches diameter should be about twelve in number, the outer edge of each beater being made to correspond with the internal shape of the working hoops and conical bottoms attached thereto, leaving sufficient space between for the motion of the grain and air, &c., and for the beaters to revolve freely. These beaters are attached to the revolving spindle by their upper edges being connected to a flat disk fastened to the spindle—this disk should be a little larger in diameter than the orifice in the conical bottoms of the hoops above described. To the lower and oblique or conical parts of each set of beaters is attached a conical rubber plate corresponding in shape with the concave conical part of the rings, this conical rubber has furrows or small beaters or both upon its outer surface, which furrows or beaters have a small draft downward so as to counteract somewhat the centrifugal tendency of the grain so as to let it pass with sufficient rapidity between the rubbing surfaces of the two cones. In the annexed drawings Fig. 3, is a perspective view of the fans or beaters and conical rubbing plate, *a a*., &c., are the fans, *c*. the conical rubbing plate and, *e*. the disk attached to the spindle by a set screw. It will be observed that the upper hoop *g*. 1. Fig. 1, has no tube or channel for admission of air that being in the upper hoops unnecessary, the tube in this hoop is therefore used to conduct grain into the machine. There is shown in the drawing Fig. 1. a side tube, *d*. into which all the discharging air orifices communicate—this side tube is not essential as the air smut and dust may be conducted off by separate tubes.

I have above described my improved smut machine as being composed of hoops with grates and conical bottoms, but it may be constructed by placing within a hollow cylinder or drum the circular grates and conical bottoms above described at proper distances from each other in the order above described, with orifices and tubes for the ingress and egress of air as above stated.

The annexed drawing Fig. 7. is a vertical section of the machine through its axis. *a*. is a pulley upon the upper end of the revolving spindle by which motion is communicated to the spindle with the parts attached thereto, *b. b. b.* the spindle; *n. n.* &c., the beaters or fans moving within the hoops *h. h.* &c., and their conical bottoms, *i. i.* &c. *c*. is a tube for the admission of grain. *g. g.* &c., are the hoops having circular grates *o. o.* &c., at their lower parts. *e. e.* tubes for the admission of air. *m. m. m.* orifices for the discharge of air, smut and dust into the side tube, *d. d.*

The operation of the machine is as follows: The spindle with the parts attached being put in rapid rotary motion the grain to be cleaned is introduced into the upper hoop Fig. 7. by the tube or channel *c*. and passes through the central opening in the upper circular grate falling upon the upper disk, 2. 2. where it is thrown by centrifugal force to the inner surface of the upper or first working hoop—being thrown about and scoured by the fans or beaters, and conical rubber—the grain then drops through the circular orifice of the first conical bottom onto the second disk, and so on through the several compartments of the machine until it is delivered out through the orifice in the lowest conical bottom, completely cleaned. In the mean time air is drawn into the machine at the bottom and through the two tubes or channels, *e. e.* and discharged with the smut dust &c., detached from the wheat or other grain through the orifices, *m. m. m.*

I claim as my invention,

1. The admission of air at several places along the sides of the machine by tubes or channels or tubes in the manner described.

2. The combination of the conical rubbers with the fans or beaters both as herein set forth.

3. The circular gratings or partitions in combination with the fans and rubbing surfaces as above described.

RALPH SUMMERS.

Witnesses:
I. T. MILLER,
G. H. McCLARY.